(No Model.)
C. JENKINS.
Piston Packing.
No. 242,133. Patented May 31, 1881.
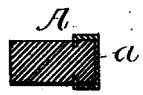
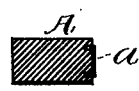
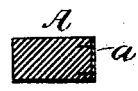
Fig. 1.     Fig. 2.     Fig. 3.
Fig. 4.     Fig. 5.
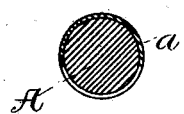
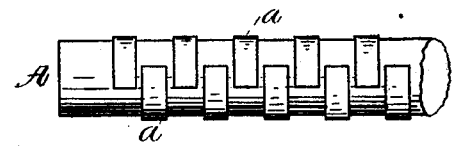
Fig. 6.     Fig. 7.
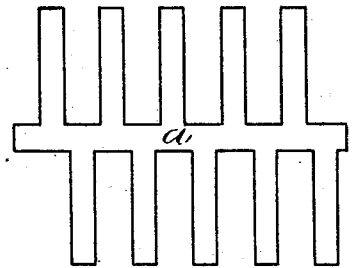
Fig. 10.     Fig. 8.
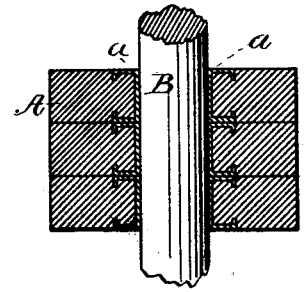
Fig. 9.
WITNESSES
H. C. Fogg
E. A. Phalen
INVENTOR
Charles Jenkins
by his attys
Clarke & Raymond

UNITED STATES PATENT OFFICE.

CHARLES JENKINS, OF BOSTON, MASSACHUSETTS.

PISTON-PACKING.

SPECIFICATION forming part of Letters Patent No. 242,133, dated May 31, 1881.

Application filed March 19, 1881. (No model.)

*To all whom it may concern:*

Be it known that I, CHARLES JENKINS, of Boston, in the county of Suffolk, State of Massachusetts, a citizen of the United States, have made a certain new and useful Improvement in Plastic Piston-Packing, of which the following is a full, clear, and exact description, reference being had to the accompanying drawings, forming a part of this specification, in explaining its nature, in which—

Figures 1, 2, and 3 are cross-sections illustrating my invention; Figs. 4 and 5, perspectives representing the same; Fig. 6, a cross-section of the modification shown in Fig. 4; Fig. 7, a rear elevation of the modification shown in Fig. 5; Fig. 8, a plan of a metallic facing, hereinafter described; Fig. 9, a view representing the application of my invention to packing piston-rods. Fig. 10 represents sections of modifications of my invention, consisting of packing containing soft metal or wood in small pieces.

This invention has for its object a packing for piston-rods, valve-stems, &c., consisting of a vulcanizable or vulcanized compound containing heat-resisting or refractory matter—earthy, stony, mineral, or animal—surfaced with soft metal, wood, or other suitable material, to prevent the attrition of the packing.

In the drawings, A represents the packing, *a* its facing, and B a piston-rod or valve-stem packed thereby.

The packing I prefer is that described in Letters Patent Reissue No. 3,579, granted Nathaniel Jenkins, dated August 3, 1869, or that described in Patent No. 232,974, granted Alfred B. Jenkins and me, dated October 5, 1880, although I may use any other compound of a like nature, or a compound containing the ingredients mentioned in said Letters Patent, in different proportion from those therein described, or any vulcanizable or vulcanized compound containing heat-resisting or refractory matter, or which is composed of heat-resisting or refractory mineral or earthy matter cemented or held together by india-rubber, gutta-percha, or other material of a like nature.

A composition which I esteem of considerable value, and which will answer the purposes of this invention as well as those I have already named or referred to, consists in a compound containing india-rubber, gutta-percha, or either, seven to twenty parts; sulphur, from three to twenty-five parts; and talc, asbestus, or plumbago, or other material of a lubricating nature, from thirty to ninety parts. This last-named element of the composition may be all talc, all plumbago, or a mixture of talc, asbestus, and plumbago, or a compound that shall contain at least fifty per cent. of talc, asbestus, or plumbago, separately, or a mixture of one or more of them therewith. This compound may be vulcanized before use, or not, as desired.

A facing to prevent attrition may be secured to the packing in any desirable manner, and I illustrate two or three of the most obvious.

In Figs. 4 and 5 the facing consists of a strip of soft metal having arms which are bent about the packing in such a manner as to bring the soft-metal strip in a position to come in contact with the piston-rod when about it.

In Fig. 1, I represent a soft-metal plate having projections extending partly about the packing, the edges being bent over and partly indented therein, if desired.

In Fig. 2, I show a metal facing, projections extending directly into the packing and uniting it thereto.

The packing may be wound with wire, if desired, to provide this metal facing above mentioned. It may have a facing in lieu of metal, wood, or any other material; and in Fig. 3, I represent a facing of wood, fastened to the facing by nails, pegs, or locks.

It is not essential that the packing be faced with a continuous strip of soft metal or wood to practice my invention; but the soft metal or wood may be incorporated into the packing in small pieces, and the result will be the same—namely, the rapid attrition of the packing by the movement of the piston-rod or valve-stem is prevented or diminished. When soft-metal or wooden pieces are employed in this manner they are mixed, preferably, with the remainder of the ingredients in making the compound, or are rolled into the wearing-surface of the packing only, although they may be inserted into the bearing-surface of the packing only.

Another method of preventing the too rapid attrition of the packing consists in covering it with a flexible material, braided or wound around it, or it may be enveloped in wire-gauze.

The packing protected in either of the above-named ways may be round in cross-section, or it may be square, or rounded upon one surface only, or of any other desirable shape, the metal, wood, or other material to prevent attrition being upon the side designed to be nearest the piston-rod or valve-stem, or applied to the exterior of the packing. It may be applied to the piston-rod or valve-stem in the shape of rings, or it may be wound spirally about the same, or in any other desirable manner; and it is compressed in the packing-chamber as it is heated until it fills.

The value of this invention consists in the packing quality of the compound employed, which in use fills the entire space back of and around its metal or other face, and thereby furnishes a uniform and steam and water tight bearing or support behind and about it, and at the same time keeps the soft-metal or other facing up against the piston-rod, thereby preventing the attrition or wear coming wholly upon the packing.

The packing may be vulcanized before it is used, or it may be vulcanizable stock, which is vulcanized in place by the heat of the steam, or by friction, or either.

I am aware that Patent No. 54,523, granted to C. S. Frink, dated May 8, 1866, shows and describes a vulcanized compound for valve-seat packing containing metal filings intimately mixed therewith; also, that Patent No. 226,832 describes a piston-packing consisting of a core of flax, hemp, cotton, or other similar substance, wound helically with a strip of soft metal; and also that Patent No. 226,644 describes a steam-packing consisting of a core of metallic turnings, surrounded by a layer of cloth and alternate layers of anti-friction metal and brass in the form of narrow strips wound spirally upon the cloth-covered core; but as the said patents do not describe a piston-packing of vulcanized or vulcanizable material containing heat-resisting matter, lined, coated, or surfaced with soft metal, or containing soft metal or wood upon its wearing-surface, I consider that they do not embrace the spirit of this invention.

Having thus fully described my invention, I claim and desire to secure by Letters Patent of the United States—

A piston-packing of vulcanized or vulcanizable material containing heat-resisting or refractory matter, lined or surfaced upon one or more sides with a facing of soft metal, wood, or other material, to prevent attrition of the packing, substantially as and for the purposes described.

CHARLES JENKINS.

Witnesses:
W. C. FOGG,
F. F. RAYMOND, 2d.